Oct. 6, 1942.    N. R. SCHWARTZ    2,298,176
SWIVEL UNIT
Filed Dec. 26, 1940
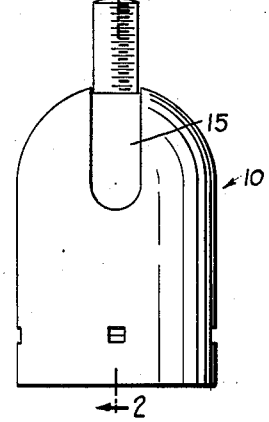
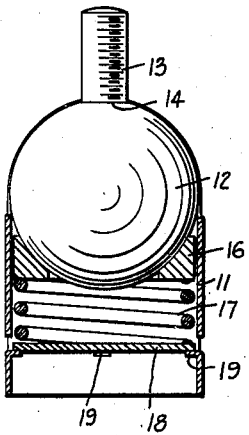
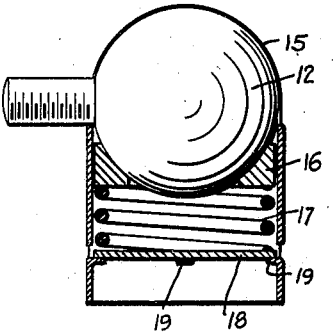
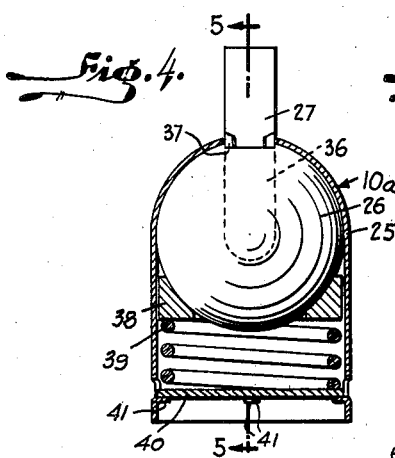
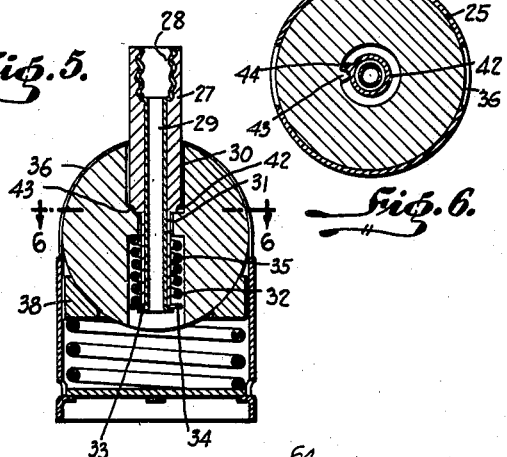
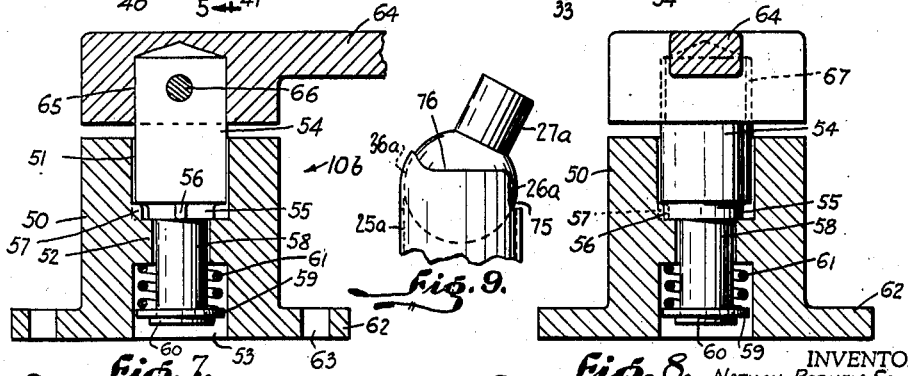
INVENTOR.
NATHAN RODNEY SCHWARTZ.
BY
ATTORNEY.

Patented Oct. 6, 1942

2,298,176

UNITED STATES PATENT OFFICE 2,298,176

SWIVEL UNIT

Nathan Rodney Schwartz, New York, N. Y.

Application December 26, 1940, Serial No. 371,691

4 Claims. (Cl. 287—87)

This invention relates to swivel units and more particularly to such types of units, which permit objects mounted thereon to be adjustably supported in many positions.

Broadly, it is the principal object of this invention to provide a swivel unit comprising a housing within which a ball is positioned, said ball having a spindle integral therewith, and means for turning the spindle axially to any desired position, and also means for turning the spindle angularly to 180 degrees of its normal axis or any fraction thereof.

A further feature is in the provision of a swivel unit upon which may be mounted a variety of objects, a housing for the unit, means cooperating between housing and a spindle extending therefrom to permit the spindle to be turned angularly up to 180 degrees, and means to limit the rotative movement of the spindle at slightly less than 360 degrees.

A still further feature of this invention lies in the provision of a swivel unit upon which may be mounted a plurality of objects and means whereby the unit may be turned and firmly supported at any desired angle up to 90 degrees in either direction relative to its normal axis.

Yet another advantage lies in the provision of a swivel unit of this type which is inexpensive to manufacture and which has means incorporated therein by which it is automatically retained in any of its adjusted positions.

It is a further purpose to provide a swivel unit of this character upon which may be selectively mounted an advertising display, a microphone, a camera, etc., and means for supporting these objects angularly and for turning them axially slightly less than one complete revolution.

These and other advantageous objects which will become more clearly apparent as the description hereof proceeds, are accomplished by the novel construction, combination and arrangement of parts, hereinafter described and illustrated in the accompanying drawing, forming a material component of this disclosure, and in which:

Figure 1 is a side elevational view of a swivel unit, showing an embodiment of this invention.

Figure 2 is a sectional view taken on line 2—2 of Figure 1.

Figure 3 is a view similar to Figure 2, but showing the ball turned downwardly at an angle of 90 degrees relative to its normal axis.

Figure 4 is a modification of my invention, the figure being a partial side elevation and partial sectional view.

Figure 5 is a cross-section taken on line 5—5 of Figure 4.

Figure 6 is a sectional view taken on line 6—6 of Figure 5.

Figure 7 is a sectional view of another modification.

Figure 8 is a view similar to Figure 7 but slightly modified and showing the arm turned at an angle of 90 degrees; and Figure 9 is a side elevational view of still another modified form of the invention.

Referring in greater detail to the drawing, the numeral 10 designates in general the form of my invention illustrated in Figures 1, 2 and 3, which consists of a thin walled metallic casing 11 having substantially flat sides and a rounded upper portion as is indicated in the drawing.

Completely enclosed in the rounded upper portion of the housing 11 is a solid ball 12 having integral therewith a cylindrical spindle 13 joined to the ball as at 14.

On opposite sides of the housing are slots 15 reaching from the apex of the casing to a point therebelow. When it is desired to turn the spindle angularly, it is manually entered in either of these slots.

Ball 12 is held in its position by a circular seat 16 which is pressed upwardly against the ball by a tension spring 17 held by washer 18. A plurality of increasing lugs 19 are stamped out of the housing 11 to support the washer 18.

The modified form of the invention illustrated in Figures 4, 5 and 6 of the drawing at 10a comprises a housing in which is completely retained a ball 26 having retained therein a hollow cylindrical spindle 27. The upper part of the spindle is provided with an inwardly threaded screw socket 28, which becomes narrower as at 29 and the lower part of which enters into the central opening of spring 35. Spindle 27 terminates in a flared portion 33 so as to form a seat for washer 34. A compression spring 35 rests upon washer 34 to tensionally engage the spindle within the ball. On opposite sides of the housing 25 there are provided slots 36 extending from the apex of the housing to points therebelow.

Formed on the ball 26 are a plurality of lugs 37 extending outwardly beyond the housing the purpose of which is to prevent the ball from rotating within the housing. When the swivel unit is assembled, the lugs will meet the housing at the terminus of slots 36 near the upper edges thereof to form blocks which will prevent the rotation of the ball within the housing. Ball 26 is held in place by a retainer spring 38 which is urged against the ball by a tension spring 39 resting on washer 40. A plurality of inreaching lugs 41 are stamped out of the housing 25 to support washer 40. Spindle 27 is provided with a groove 42 and a projection 44, while the ball 26 is also formed with a projection 43. When the spindle 27 is rotated on its axis such rotation will stop when projection 43 and the projection on the spindle come in contact, thus limiting the rotative movement of the spindle to slightly less than one complete turn.

Another modification is illustrated in Figures 7 and 8 which consists of a bottom member 50 having a bore 51, a constricted portion 52 and another bore 53. Within the bore 51 is a shaft 54 having a reduced portion 55 forming a projection 56 which is adapted to stop against 57 on the bore 51. Shaft 54 at its lower end, forms a shaft 58 of smaller diameter which is riveted over washer 59 as at 60. Member 50 terminates in a flange 62 which is provided with bolt holes 63. As illustrated in Figure 8, the use of pin 66 may be eliminated by providing the upper portion of shaft 54 with internal threads as at 67.

A further modification is illustrated in Figure 9 which shows a housing 25a and a ball 26a retained therein. The ball however is not entirely enclosed in the housing, but only slightly more than half of the ball is enclosed therein.

The ball 26a has integral therewith a spindle 27a and housing 25a is provided, at opposite sides thereof, with slots 36a and 75.

The device here described lends itself to a great many uses. For instance, an advertising display stand, having its central portion properly constructed, may be screwed onto the swivel unit illustrated in Figure 1. The principal form as well as the modifications may be used in connection with a tripod on which a camera may be mounted, a microphone may be secured to the swivel unit, or a telephone, lamp, book or any other suitable object may be placed upon arm 64 of the modification illustrated in Figures 7 and 8. These are but a few of the very many uses to which the invention may be put.

In operation, when it is desired to manually turn the spindle axially, it is merely rotated. In the device illustrated in Figure 1 and Figure 9, the spindle may be rotated in either direction without hindrance, but the other forms are provided with stops, so that the spindle can be given only somewhat less than one complete turn in either direction.

When the spindle is to be turned angularly, it is entered in one of the slots in the housing, and it is automatically retained in any of its angular positions by the pressure of the spring and retainer ring against the ball.

Many modifications become apparent from an inspection of the disclosure, and others will become apparent through use. For instance, in the several views there are illustrated two slots on opposite sides of the housing. More than two slots may be provided, or less if desired. In the several views, both slots are indicated as reaching down to the same point on opposite sides of the housing. This may be changed by having one slot end at a point higher than the other slot or slots. Thus the angularity which can be achieved is varied; the device shown in Figure 1 can be provided with lugs 37 shown in Figure 4, thus producing a swivel unit which may be angularly turned, but which cannot be rotated on its axis; and the projections indicated in Figures 7 and 8 may be omitted, thus making it possible to turn that unit axially without hindrance.

It becomes clear therefor that there have here been illustrated and described the best known embodiments of the invention, but the disclosure is not to be construed as being limitative or restrictive to the exact details shown, it being apparent that changes in construction may be made within the scope of the appended claims, without departure from the spirit of the present invention.

Having thus described the invention, what is claimed as new and desired to secure by Letters Patent is:

1. A swivel unit comprising a housing, a ball in said housing, a spindle integral with said ball and extending from said housing, means within said housing adapted to press said ball upwardly against said housing, means integral with said housing to support said pressing means, said housing having a plurality of slots extending from the apex downwardly to points therebelow in which the spindle may be turned angularly to within 180 degrees, said spindle being adapted to be rotated on its axis.

2. A swivel unit comprising a housing having a rounded top, a ball in said rounded top, a spindle rotatably mounted in said ball, a spring adapted to tensionally retain said spindle in said ball, a ring on which said ball is seated, a spring for urging said ring against said ball, slots in said housing on opposite sides thereof to permit said spindle to turn angularly on its axis through 180 degrees, and means cooperating between said spindle and said ball to limit the rotative movement of said spindle.

3. A swivel unit comprising a housing rounded at its top, a ball completely enclosed in said housing, said ball having a hollow interior, a hollow cylindrical spindle in said ball, a screw socket on the upper part of said spindle, a washer, means formed by the lower part of said spindle on which said washer rests, a compression spring seated on said washer to tensionally engage said spindle in said ball, slots in said housing to permit said spindle to be turned angularly, means for retaining said spindle in any adjusted angular position, means on said ball to prevent its being axially rotated in said housing, and means cooperating between said spindle and said ball to limit the rotative movement of said spindle to substantially one complete turn.

4. A swivel unit comprising a housing, a ball in said housing, said housing enclosing over half the peripheral surface thereof, means integral with said housing for supporting said ball, a cylindrical spindle integral with and extending from said ball and slots in said housing extending from the apex to points therebelow in which said spindle may be turned angularly through 180 degrees of its normal axis.

NATHAN RODNEY SCHWARTZ.